United States Patent Office 3,714,116
Patented Jan. 30, 1973

3,714,116
POLYIMIDE COMPOSITIONS
Emanuele Scalco, Sunnyvale, Calif., assignor to Raychem Corporation, Menlo Park, Calif.
No Drawing. Filed Apr. 8, 1970, Ser. No. 26,796
Int. Cl. C08g 51/58, 51/60
U.S. Cl. 260—45.9 R       7 Claims

ABSTRACT OF THE DISCLOSURE

This application relates to compositions comprising polyimides susceptible to oxidation and a tertiary phosphine oxide. Also the application is directed to an antioxidant composition comprising a phosphite antioxidant, a phenolic antioxidant and a tertiary phosphine oxide and mixtures of such antioxidant compositions with polyimide.

---

This invention relates to polyimide compositions, and more especially to stabilization of such compositions against heat degradation.

In U.S. applications Ser. No. 760,659, Edward C. Stivers, now U.S. Pat. No. 3,551,200 issued Dec. 29, 1970, and Ser. No. 760,713, Vincent L. Lanza and Edward C. Stivers, now U.S. Pat. No. 3,607,387 issued Sept. 21, 1971, both filed Sept. 18, 1968 and assigned to Raychem Corporation, the disclosures of which are incorporated herein by reference, there are described certain melt-processable polyimides and electrically insulating materials made from such polyimides.

As described in these applications, the polyimides have high melting points which enable them to be used in high-temperature environments. The polyimides described and other polyimides derived in part from aliphatic precursors are, however, subject to degradation at elevated temperatures in the presence of oxygen, and antioxidants are therefore added to prolong the life of structures based on such polyimides. Because of the high temperatures involved in processing the polyimides, as well as in use, however, commercially available antioxidants have not proved completely satisfactory partly because, it is believed, they are volatile at the temperatures employed in preparing structures from the composition.

Thus, it is an object of the present invention to provide antioxidants and antioxidant systems suitable for use in polyimides susceptible to heat or oxidative degradation.

It is a further object of the invention to provide polyimides having increased life at high temperatures.

It is a further object of the invention to provide electrical and insulated electrical components having increased resistance to heat aging.

According to the invention, there is provided a composition comprising a polyimide susceptible to oxidation and a tertiary phosphine oxide.

Also, according to the invention, there is provided an antioxidant system comprising (A) a phosphite antioxidant
(B) a phenolic antioxidant and
(C) a tertiary phosphine oxide The present invention also provides a composition comprising a polyimide susceptible to oxidation and antioxidant quantities of a system comprising (A) a phosphite antioxidant
(B) a phenolic antioxidant and
(C) a tertiary phosphine oxide Further, the present invention provides a process for improving the stability of a polyimide susceptible to oxidative degradation, which comprises admixing the polyimide with stabilizing quantities of the system according to the invention.

The invention also provides insulated electrical conductors, the insulation comprising a polyimide and an antioxidant or antioxidant system.

As the phosphite antioxidant, there may be employed any phosphite ester of the type generally used or described in the literature as antioxidants for polymers provided it has a molecular weight in excess of about 500, advantageously in excess of about 750, preferably in excess of about 1250.

Suitable materials are described in U.S. Pat. No. 2,733,226 to B. A. Hunter and in U.S. Pat. No. 3,047,608 to L. Friedman et al. the disclosures of which are incorporated herein by reference.

As examples of suitable phosphites there may be mentioned compounds of the formula

(1)

in which $R_1$, $R_2$, and $R_3$, which may be the same or different is substituted or unsubstituted alkyl, aralkyl or alkaryl radical, advantageously nonylphenyl, and preferably $R_1$, $R_2$, and $R_3$ are all nonylphenyl radicals.

As further examples of suitable phosphites there may be mentioned compounds of the formula

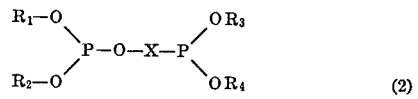

(2)

in which $R_1$, $R_2$, $R_3$, and $R_4$ each represent a substituted or unsubstituted alkyl, aralkyl or alkaryl radical, or $R_1$ and $R_2$ taken together or $R_3$ and $R_4$ taken together represent substituted or unsubstituted alkylene, aralkylene or alkarylene radicals, and in which $R_1$, $R_2$, $R_3$ and $R_4$ may be the same or different. X may represent $(CH_2CH_2O)_n$, $(CH(CH_3)CH_2O)_n$ or $(CH_2CH_2CH_2O)_n$ in which $n$ represents at least unity, and need not be integral. Especially preferred is the compound

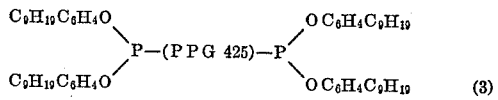

(3)

in which PPG 425 represents polypropylene glycyl with an average molecular weight of 400–450. This compound is commercially available as Weston 425 Phosphite.

As the phenolic antioxidant, there may be employed any phenol of the type generally used or described in the literature as antioxidants for polymers, provided that they meet the molecular weight requirements set forth above for the phosphite esters. Examples of phenolic antioxidants are given in U.S. Patent No. 3,454,521 to Tholstrup, the disclosure of which is incorporated herein by reference and in U.S. application No. 359,460 (published as the priority document of British Patent No. 1,103,144 in the name of J. R. Geigy AC.) the disclosure of which is incorporated by reference herein. Especially suitable are those compounds of the formula

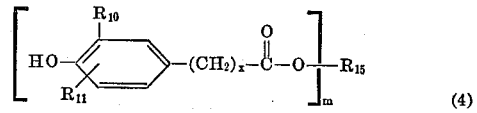

(4)

in which $R_{10}$ and $R_{11}$ which may be the same or different represents alkyl groups, preferably tertiary butyl groups, $x$ represents a integer from 1 to 6, preferably 2, $m$ is 3 or 4, preferably 4 and $R_{15}$ is the residue of an aliphatic polyol. Preferably $R_{11}$ is in the ortho position to the phenolic hydroxy group. Advantageously, the phenolic antioxidant is tetra-[methylene-3-3(3,5-di-t-butyl-4-hydroxylphenol)propionate] methane which is commercially available as Irganox 1010.

As tertiary phosphine oxides there may be mentioned, for example, those disclosed in U.S. Patent No. 3,067,251 to Rauhut and Semsel, the disclosure of which is incorporated by reference herein. These compounds are of the formula

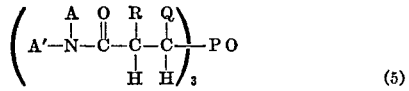
(5)

wherein A represents hydrogen, lower alkyl, or phenyl, A' represents hydrogen or lower alkyl, R represents hydrogen or methyl, and Q represents hydrogen, methyl or phenyl. A preferred compound is tris(2-carbamoylethyl) phosphine oxide.

Other suitable compounds include those disclosed in British Patent No. 983,663 to American Cyanamid which are not also disclosed in U.S. Patent No. 3,067,251. These include compounds of the formula

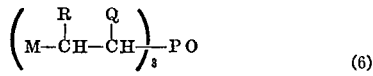
(6)

wherein Q and R have the meanings assigned for Formula 5 above and M is an electronegative substituent. By electronegative substituent is meant one having a sigma(para) constant greater than +0.3 as defined in "A Re-evaluation of the Hammett Equation," H. H. Jaffe, Chemical Reviews, 53, 191 (1953). A prefered example of such a substituent is the cyanide radical.

As specific examples of phosphine oxides, there may be mentioned

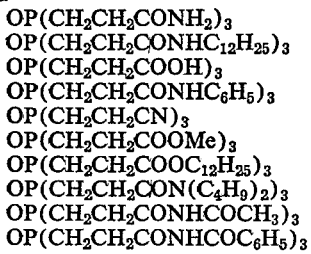

The relative proportions of the three components are by no means critical, nor is the percentage by weight in a polyimide. It will, however, be found that from about 0.05% to about 5% by weight of each component, preferably from about 0.5% to about 2%, in a polyimide composition gives satisfactory results, each component being present in approximately equal quantities by weight. Advantageously, the total weight of antioxidant is at most about 8%, preferably at most about 4%, based on the weight of polyimide. It is a matter of simple routine experiment to determine for a given system within the invention the optimum ratios and proportions. Further, it is within the invention to use mixtures of two or more compounds within each category and to add other antioxidant materials to the system and composition. The stabilized polyimide compositions of the invention may further comprise the usual additives to polymer systems, for example, fillers, flame retardants, and pigments. The compositions of the invention can be crosslinked, for example by ionizing radiation. The following examples, in which parts are by weight unless otherwise stated, illustrate the invention.

EXAMPLES

In these examples, a polyimide was intimately mixed with the stated quantities of antioxidant(s) and pressed at 320° C. into slabs 6" x 6" x 0.012. Sample strips 0.25" wide were cut from the slabs and hung in an oven at the stated temperature. The samples were inspected at intervals and tested for brittleness by folding. Four folds were made, one each parallel and transverse to the longitudinal axis of the strip, and two folds perpendicular to each other, at 45° to the axis. The degree of degradation, as indicated by brittleness in folding, was assessed on a scale of 1 to 5, stage 5 representing complete disintegration of the sample on handling, stage 4 representing severe cracking on all folds, the lower numbers being subjective assessments down to 1, representing no cracking on folding.

Example 1

Poly(1,12 - dodecamethylene pyromellitimide) was blended with the stated quantities of commercially available antioxidants such that the total composition added up to 100 parts.

| | Antioxidant | Parts |
|---|---|---|
| Comparison: | | |
| A | Irganox 1010 | 2.5 |
| | Weston 425 Phosphite | 0.2 |
| B | Irganox 1010 | 2.5 |
| | Weston 425 Phosphite | 0.5 |
| | Advastab T360 | 1.0 |
| C | Irganox 1010 | 2.5 |
| | Weston 425 Phosphite | 0.5 |
| | Vanstay RRZ | 1.0 |
| D | Irganox 1010 | 2.5 |
| | Weston 425 Phosphite | 0.5 |
| | Ethyl 796 | 1.0 |
| E | None | |
| F | Tris(2-carbamoylethyl)phosphine oxide | 2.0 |
| G | Irganox 1010 | 2.5 |
| | Weston 425 Phosphite | 0.5 |
| | Tris(2-carbamoylethyl)phosphine oxide | 1.0 |

Replicate samples of the five compositions were aged at the temperatures shown, and the time in hours for the first sample to reach given evaluation stages was recorded.

| | Time (hours at 200° C.) | | | |
|---|---|---|---|---|
| Samples | Stage 1 | Stage 2 | Stage 3 | Stage 4 |
| Comparison: | | | | |
| A | 108 | 144 | 192 | |
| B | 108 | 192 | 192 | |
| C | 108 | 168 | 216 | |
| D | 144 | 186 | 186 | |
| E | | | | 28 |
| F | | | 237 | |
| G | 136 | 192 | 227 | |

| | Time (hours) at 250° C. | |
|---|---|---|
| Comparison: | | |
| A | 10.5 | 10.5 |
| B | 10.5 | 10.5 |
| C | 10.5 | 10.5 |
| D | 8.5 | 8.5 |
| E | | 1 |
| F | | 8 |
| G | 10.0 | 11.5 |

It can be seen that the addition of tris(2-carbamoylethyl) phosphine oxide achieves a significant increase in oxidative resistance in the polymer, compared with additions of equal commercially available antioxidants.

Advastab T360 is an organotin vinyl stabilizer sold by the Advance Division of Carlisle Chemical Works, Inc.

Vanstay RRZ is a mixture of barium, cadmium and zinc compounds in an organic solvent, sold by R. T. Vanderbilt Company, Inc.

Ethyl 796 is believed to be tris(3,5-di-tert-butyl-4-hydroxyphenyl)phosphate, sold by Ethyl Corporation.

Example II

In this example, a copolymer of pyromellitic anhydride with 1,12-dodecane diamine and "dimer diamine," the molar ratio of dodecane diamine and dimer diamine being 70:30, was used. This polymer is disclosed in pending U.S. Ser. 852,921, in the name of D. Magay, filed Aug. 25, 1969, the disclosure of which is incorporated by reference herein. The copolymer was mixed with stated quantities of additives such that the total was 100 parts.

| | Additive | Parts |
|---|---|---|
| Comparison H | Nil | |
| I | Irganox 1010 | 5.0 |
| | Weston Phosphite | 2.0 |
| J | Irganox 1010 | 5.0 |
| | Weston 425 Phosphite | 1.0 |
| | Tris(2-carbamoylethyl)phosphine oxide | 1.0 |
| K | Irganox 1010 | 5.0 |
| | Weston 425 Phosphite | 1.0 |
| | Tris(2-carboxyethyl)phosphine oxide | 1.0 |
| L | Irganox 1010 | 5.0 |
| | Weston 425 Phosphite | 1.0 |
| | Tris[2-(N-acetylcarbamoyl)ethyl] | 1.0 |

Replicate samples of the five compositions were aged at the temperatures shown, and the evaluation stage reached at given times in hours noted.

| | Time (hours) at 200° C. | | | |
|---|---|---|---|---|
| Samples | Stage 1 | Stage 2 | Stage 3 | Stage 4 |
| Comparison H | | | | 1.5 |
| I | | | | 990 |
| J | 195 | 220 | 245 | |
| K | 195 | 220 | 245 | 270 |
| L | 195 | 245 | | 270 |

| | Time (hours) at 250° C. | | |
|---|---|---|---|
| Comparison H | | | 0.15 |
| I | | | 8 |
| J | 10 | 12 | 14 |
| K | 10 | 12 | 14 |
| L | 10 | 12 | 14 |

Example III

Poly(1,12 - dodecamethylene pyromellitimide) was blended with the following antioxidant system, the parts being weight.

Comparison M:
  Irganox 1010 _____ 2.5
  Weston 425 Phosphite _____ 0.5
  Tris(2-carbamoylethyl)phosphine oxide _____ 1.0
  Polymer _____ 96.0

Slabs as described in Example 1 were examined after heat aging at 250° C.

Time (hours):      Condition (stage)
  8 _____ 1
  10 _____ 2,3
  12 _____ 4

Example IV

Samples of electrical wire (20 gauge, tin plated copper conductor) were insulated with 0.010 inch thickness of polymer composition of Comparison M and subjected to heat aging at 250° C.

Failure criterion: Aged samples were bent 180° in seven different locations along the wire, any evidence of cracking was then taken as a failure. The table lists the number of locations which failed.

Aging time (hours):      Number of failures
  8 _____ 0
  10 _____ 0
  12 _____ 3
  14 _____ 6

Thus, it can be seen that widely differing tertiary phosphine oxides are suitable as polyimide antioxidants.

The foregoing examples are merely illustrative of the present invention and are not to be taken as limiting the scope of this invention. For example, the amounts of additives can be varied over a wide range, the only limits being the desirability of the properties of the compositions obtained. Further it is clear that a wide range of tertiary phosphine oxides can be used either alone or in combination with a phosphite antioxidant and a phenolic antioxidant. Thus it can be seen that the invention is limited only by the scope of the claims which follow.

I claim:

1. A composition comprising an oxidation susceptible polyimide and a tertiary phosphine oxide having the formula

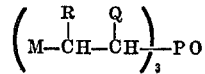

wherein M is an electronegative substituent, R represents hydrogen or methyl, and Q represents hydrogen, phenyl or methyl.

2. The composition of claim 1 wherein M is selected from the group consisting of amide, carboxyl, ester, cyanide groups.

3. The composition of claim 1 wherein the polyimide is poly(1,12-dodecamethylene pyromellitimide).

4. A composition as claim in claim 1, wherein the tertiary phosphine oxide is tris(2-carbamoylethyl) phosphine oxide.

5. A composition as claimed in claim 1 which contains up to about 4% by weight of tertiary phosphine oxide, based on the weight of the polymer.

6. A composition comprising an oxidation susceptible polyimide.
  (A) a phosphite antioxidant selected from the group consisting of compounds of the formula

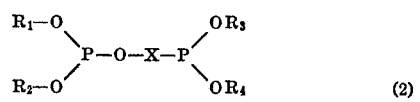

in which $R_1$, $R_2$, $R_3$, and $R_4$, which may be the same or different, each represent an alkyl, aralkyl or alkaryl radical, or in Formula 2 $R_1$ and $R_2$ taken together or $R_3$ and $R_4$ taken together represent alkylene, aralkylene or alkarylene radicals, and X represents $(CH_2CH_2O)_n$, $(CH(CH_3)CH_2O)_n$, $(CH_2CH_2CH_2O)_n$ in which $n$ represents at least unity and need not be integral, (B) a phenolic antioxidant of the formula

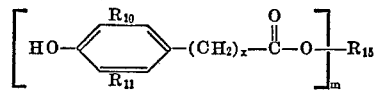

wherein $R_{10}$ and $R_{11}$ which may be the same or different represent alkyl groups, X represents an integer from 1 to 6 $m$ represents 3 or 4 and $R_{15}$ represents the residue of an aliphatic polyol and (C) a tertiary phosphine oxide of the formula

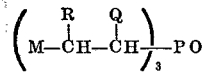

wherein M is an electronegative substituent, R represents hydrogen or methyl and Q represents hydrogen, methyl or phenyl each of components A, B and C being present in an amount from about 0.05% to about 5% by weight.

7. An article comprising an insulated conductor, the insulation comprising an oxidation-susceptible polyimide and a tertiary phosphine oxide having the formula

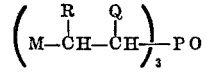

wherein M is an electronegative substituent, R represents hydrogen or methyl, and Q represents hydrogen, phenyl or methyl.

(References on following page)

References Cited

UNITED STATES PATENTS

| | | | |
|---|---|---|---|
| 3,531,437 | 9/1970 | Rio | 260—47 |
| 3,544,504 | 12/1970 | Ulmer | 260—31.2 |
| 3,513,134 | 5/1970 | Filius | 260—78 |
| 3,416,994 | 12/1968 | Chalmers et al. | 161—227 |
| 3,502,730 | 3/1970 | Mason et al. | 260—606.5 |
| 3,535,277 | 10/1970 | Miller et al. | 260—45.95 |
| 3,502,613 | 3/1970 | Berger | 260—45.8 |
| 3,533,996 | 10/1970 | Grundschober et al. | 260—47 |
| 3,551,200 | 12/1970 | Stivers | 117—232 |

DONALD E. CZAJA, Primary Examiner

R. A. WHITE, Assistant Examiner

U.S. Cl. X.R.

117—232; 260—45.7 P, 45.8 R, 45.85, 45.95